United States Patent
Zhang et al.

(10) Patent No.: US 8,692,408 B2
(45) Date of Patent: Apr. 8, 2014

(54) MODULAR STACKED SUBSEA POWER SYSTEM ARCHITECTURES

(75) Inventors: Richard S. Zhang, Rexford, NY (US); Rajib Datta, Niskayuna, NY (US); Christof Martin Sihler, Bavaria (DE); Manguelle Joseph Song, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 518 days.

(21) Appl. No.: 12/317,306

(22) Filed: Dec. 22, 2008

(65) Prior Publication Data

US 2010/0133901 A1 Jun. 3, 2010

Related U.S. Application Data (60) Provisional application No. 61/119,490, filed on Dec. 3, 2008.

(51) Int. Cl.
*H02J 3/00* (2006.01)

(52) U.S. Cl.
USPC .............................. 307/12; 307/82; 307/151

(58) Field of Classification Search
USPC ............................................ 307/12, 82, 151
See application file for complete search history.

(56) References Cited

U.S. PATENT DOCUMENTS

| | | | | |
|---|---|---|---|---|
| 3,968,419 | A | 7/1976 | Ekstrom | 321/27 R |
| 4,019,115 | A | 4/1977 | Lips | 321/27 R |
| 4,837,671 | A | 6/1989 | Wild et al. | 363/35 |
| 6,670,721 | B2 | 12/2003 | Lof et al. | 290/44 |
| 7,615,893 | B2 * | 11/2009 | Biester et al. | 307/82 |
| 2008/0037190 | A1 | 2/2008 | Datta et al. | 361/115 |
| 2009/0034304 | A1 * | 2/2009 | Engel et al. | 363/71 |

FOREIGN PATENT DOCUMENTS

| | | | | |
|---|---|---|---|---|
| DE | 19847680 A1 | 4/2000 | | H02M 7/19 |
| GB | 1420984 | 1/1976 | | H02M 1/00 |
| GB | 1520884 | 8/1978 | | H02J 3/36 |
| GB | 2397445 A | 7/2004 | | H02M 5/45 |
| JP | 11089235 A | 3/1999 | | H02J 3/36 |
| JP | 2000245066 A | 9/2000 | | H02J 3/36 |
| WO | WO 01/52379 A2 | 7/2001 | | H02J 3/36 |

* cited by examiner

*Primary Examiner* — Hal Kaplan
(74) *Attorney, Agent, or Firm* — Andrew J. Caruso (57) ABSTRACT

A sub-sea power delivery system includes a plurality of modular power converter building blocks on each of the power source side and the sub-sea load side that are stacked and interconnected to meet site expansion requirements and electrical load topologies. The power delivery system comprises a system DC transmission link/bus, wherein the system DC link is configured to carry HVDC or MVDC power from an onshore utility or topside power source to multiple sub-sea load modules. The stacked modular power converter topology on the sub-sea side of the sub-sea power delivery system is symmetrical with the stacked modular power converter topology on the on-shore/top-side of the sub-sea power delivery system.

36 Claims, 9 Drawing Sheets

FIG.10

MODULAR STACKED SUBSEA POWER SYSTEM ARCHITECTURES

CLAIM TO PRIORITY OF PROVISIONAL APPLICATION

This application claims priority under 35 U.S.C. §119(e)(1) of provisional application Ser. No. 61/119,490, filed Dec. 3, 2008, by Richard S. Zhang et al.

BACKGROUND

This invention relates generally to electrical power delivery systems for offshore and sub-sea electrical loads via a direct current (DC) transmission bus. The receiving end and sending end of the DC transmission bus each comprise modular stacked power converters that are symmetrical in structure. The receiving end converters are reconfigurable based on site expansion requirements and on load types and configurations.

There is a growing industry need to deliver power, more effectively with lower cost and higher reliability/maintainability, efficiency and power density, from onshore or offshore platforms to electric loads at seabed or remote offshore locations, or vice versa in a reverse power flow direction for offshore power generation tie-back. This growing need is driven by electrification trends in various applications, such as the subsea processing for oil and gas industry and offshore wind power production.

Specifically for subsea processing for oil and gas industry, the trends are (1) more electric loads, such as electric drives and motors driving pumps and compressors for subsea processing, subsea control and communication electronics, electric pipeline heating, power supply for separator/coalescers; (2) higher power—from kilowatts to approaching 100 MW range per project; (3) longer distance—from tens of kilometers to 100~600 km; and (4) deeper water depth—from 1 km to 3 km.

To serve a large number of electric loads distributed in a region at subsea and offshore locations over a short or long distance, electric power typically needs to be transmitted from onshore or offshore platform power sources to a subsea or offshore power substation via a power transmission bus, and then further distributed to those electric loads via a power distribution bus. In some cases, newly discovered oil and gas reserves with electric loads need to be tied back to an adjacent already established power generation/transmission/distribution infrastructure.

System architectures to transmit and distribute power effectively to those subsea and offshore loads is very important—from a choice of alternate current (AC) or direct current (DC) power transmission and distribution, to selection of voltage level for transmission and distribution, to a system topological architecture. They significantly affect system cost, reliability/maintainability, system complexity, efficiency and power density. For example, offshore or subsea cables for power transmission typically form a dominant portion of overall system cost. Compared with three-phase AC power transmission, DC power transmission reduces the number and weight of cables, thus potentially reducing material and installation costs. A higher voltage for power transmission/distribution would reduce cable losses, and therefore result in higher efficiency and less cable costs. However, the electric loads may need medium voltage or low voltage, and an additional power conversion stage would be needed to convert the transmission/distribution voltage to the requisite load voltage level. An optimal system architecture would result in significantly less system complexity and cost. Subsea connectors, such as wet-mate and dry-mate connectors, and fault tolerant operation capability by bypassing faulty elements have a great impact on system reliability and maintainability. System architectures that allow a reduction in the number of subsea connectors and that provide fault tolerant operation capability are of utmost importance for long time reliable operation for subsea and offshore applications.

Three-phase 50/60 Hz AC power transmission and distribution is a mature technology. However, it has inherent limitations for long distance and high power subsea or offshore applications, or even for applications with short distance but with limited capacity margins of the power source. Due to the cable capacitance, a significant amount of reactive power needs to be supplied from the power source and carried by the cable, in addition to the active power needed by the loads. This results in higher cable losses, higher current ratings and larger and more costly cables, and higher voltage losses along the cable. These issues are exacerbated for long distance and high power transmission for oil and gas subsea projects. Even for short distance power transmission/distribution, these issues still exist for applications with a limited capacity margin of the power source. For example, for electric loads that are tied back to an existing power infrastructure on a offshore platform with limited capacity margin, a relatively large amount of reactive power may trigger power system stability issues or exceed current rating limits of the power source.

The limitations of 50/60 Hz AC power transmission and distribution may be alleviated by reducing the AC frequency, to for example 16⅔ Hz, thus reducing the amount of reactive power under the same cable capacitance. However, this solution is at the expense of proportionally increased size of magnetic components, such as transformers. At high power levels, the size and weight penalty would be excessive.

Direct current (DC) power transmission and distribution can fundamentally overcome the cable capacitance and reactive power issue for power delivery; and high voltage would further reduce losses for power transmission and distribution. Existing high voltage direct current technology uses simple 2-level circuit topology and relies on series connections of a large number of specially power switches, such as press-pack IGBTs and thyristors, to provide high voltage capability for power conversion. Due to high voltage switching with 2-level circuits, large filters are needed to smooth out the input and output. Those special power switches (valves) and large filters would make existing high voltage direct current technology an expensive and bulky solution for subsea applications.

Alternative high voltage or medium voltage direct current technology forms DC transmission or distribution bus stacking using a number of modular power converter building blocks. Since those building blocks can be made the same as those in other standard drive applications, the stacked modular DC technology offers potentially much lower cost and higher reliability. Furthermore, harmonic cancellation on the AC side can be achieved by control means for those modular converters such that filters can be significantly smaller at lower cost.

There is a need to address system architectures based on the DC transmission bus formed by modular stacked converters for power transmission and distribution serving multiple electric loads. The key objectives are to achieve optimum power delivery systems with low system cost and complexity, high system reliability/maintainability, high efficiency and power density. The targets are for applications where single or plural electric loads need to be served at subsea or offshore locations, with long or short distance, and with high or low power.

BRIEF DESCRIPTION

An exemplary embodiment of the present invention comprises a power delivery system comprising an AC power source configured to deliver power to one or plural AC loads via a DC transmission bus, the DC transmission bus comprising a sending end and a receiving end, the sending end coupled to a plurality of modular power converters configured in a stacked modular power converter topology, the receiving end coupled to a plurality of modular power converters configured in a stacked modular power converter topology, wherein the stacked modular power converter topology at the receiving end is symmetrical with the stacked modular power converter topology at the sending end.

DRAWINGS

The foregoing and other features, aspects and advantages of the invention are apparent from the following detailed description taken in conjunction with the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
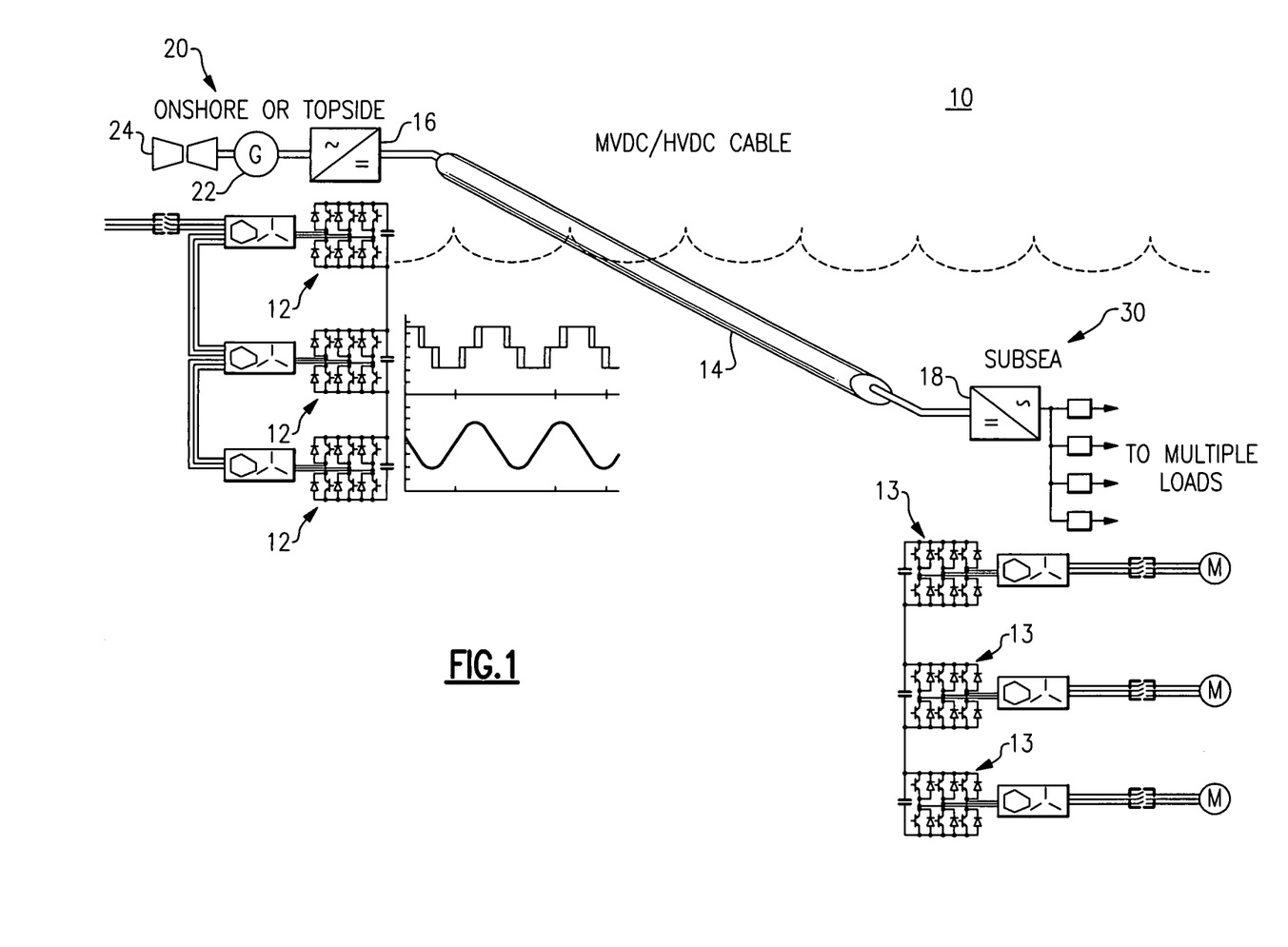
FIG. 1 is a simplified diagram illustrating a sub-sea power delivery system with stacked modular power converter building blocks on both the on-shore or top side and sub-sea side of the system according to one embodiment of the invention.

FIG. 1 is a simplified diagram illustrating a sub-sea power delivery system 10 with modular stacked power converter building blocks 12, 13 on both the top-side/on-shore side and sub-sea side of the system according to one embodiment of the invention. The sub-sea power delivery system 10 includes a system DC transmission link/bus (cable) 14 that may be a medium voltage direct current (MVDC) or high voltage direct current (HVDC) cable, wherein the transmission DC bus 14 is configured to carry power from a top-side or on-shore power module 16 to at least one sub-sea load module 18. Both the power module 16 and the sub-sea load module 18 each may include one or more respective stacked modular power converter building blocks 12, 13. Each modular power converter building block 12, 13 comprises a modular power converter such as a DC to AC inverter, AC to AC converter, DC to DC converter, or AC to DC inverter, that is common to many known types of motor drives; and therefore the power module 16 and the sub-sea load module 18 do not require customized power converters in order to meet site expansion requirements and diverse electrical sub-sea load topologies, such as for example, those topologies requiring high voltage isolation levels.

The sub-sea power delivery system 10 also comprises a power generation system 20 that may include, for example, a generator 22 driven via a turbine 24 to generate AC power. Power generation system 20 further comprises at least one power module 16 that may each comprise a plurality of industry standard modular power converters 12 that are stacked and configured together with the generator 22 and turbine 24 to generate medium voltage direct current (MVDC) or high voltage direct current (HVDC) power.

A sub-sea power distribution system 30 comprises at least one sub-sea load module 18 that each may comprise a plurality of industry standard modular power converters 13 that are stacked and configured together at the sub-sea load module side of the system to generate sub-sea distribution system voltages in response to medium voltage DC transmission power or high voltage DC transmission power levels generated via the power generation system 20.

Interconnections between the standard modular stacked power converters 12 as well as between modular stacked power converters 13 and other components described herein may be easily configured to generate the MVDC transmission voltages, HVDC transmission voltages and desired sub-sea distribution system voltages based on site expansion requirements and electrical sub-sea load topologies and to optimize, for example, matching between matched or mismatched transmission and distribution voltages and sub-sea load module voltages.

Figure 2:
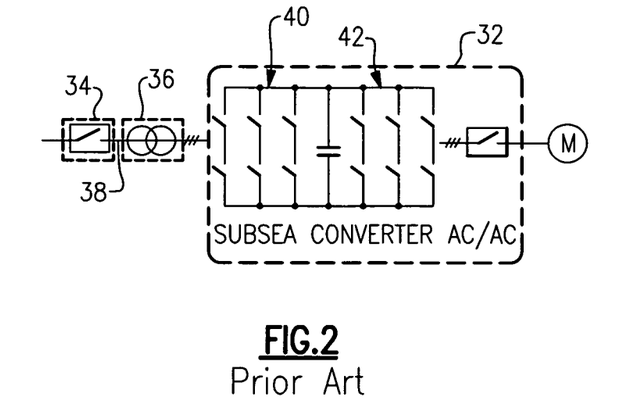
FIG. 2 is a simplified diagram illustrating a conventional sub-sea power converter module that is known in the art for a sub-sea distribution network.

FIG. 2 is a simplified diagram illustrating a conventional sub-sea power converter module 32. The conventional sub-sea power converter module 32 can be seen to also include switchgear 34 that operates to isolate the converter module 32 in the event of a converter module 32 failure. A transformer 36 is employed to reduce the AC transmission voltage at the output of the switchgear 34 to a level that is useful by sub-sea loads. A sub-sea connector 38 is also required in order to connect the switchgear 34 to the transformer 36, a feature that adversely affects the reliability of a sub-sea power distribution network. The conventional converter module 32 can be seen to include an AC to DC converter 40 and a DC to AC inverter 42.

Figure 3:
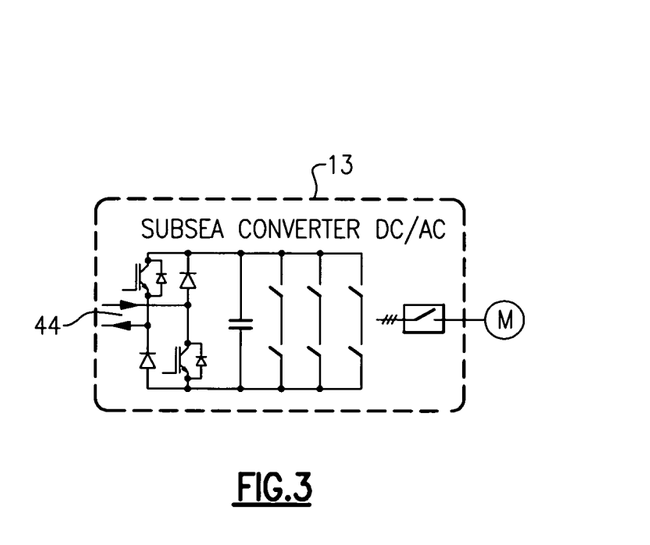
FIG. 3 is a simplified diagram illustrating a sub-sea power converter module with integrated bypass and regulation functions according to one embodiment of the invention for a sub-sea power distribution network.

FIG. 3 illustrates a sub-sea power converter module 13 with integrated bypass and regulation functions according to particular embodiments of the invention. The power converter module 13 that may be employed via a sub-sea power distribution network that includes stacked power converter modules 13 with integrated bypass and regulation functions can be seen to have a much simpler architecture than converter module 32. Power converter module 13 does not, for example, require an AC to DC conversion stage 40 since it operates in response to a DC input voltage, resulting in enhanced overall system reliability and reduced cost. Power converter module 13 can be seen to also comprise a DC chopper element 44 that may be configured, for example, as both a voltage regulator and as a bypass switch. Chopper element 44 replaces the switchgear 34 described above, and serves to bypass the sub-sea converter module 13 during a converter module 12 failure. Chopper element 44 may be configured to regulate a DC bus transmission voltage for a corresponding modular stacked power converter 13. Chopper element 44 therefore eliminates the necessity for additional sub-sea connectors between the switchgear 34 and transformer 36 and between the transformer 36 and the sub-sea converter 32 to improve system reliability and reduce system cost as stated above. Power converter module 13 is fully redundant in that it will continue to function, even when only one of the two insulated gate bipolar transistors (IGBTs) of the input bridge portion of converter module 13 is operational, according to one aspect of the invention.

Converter module 13 as well as other exemplary converter module embodiments described herein may employ additional filter elements, e.g. inductors. These additional filter elements are not shown in the figures or described in further detail since they are not necessary to an understanding of the novel principles described herein. The figures described herein with respect to particular embodiment of the invention are simplified to preserve brevity and to enhance an understanding of these novel principles.

Figure 4:
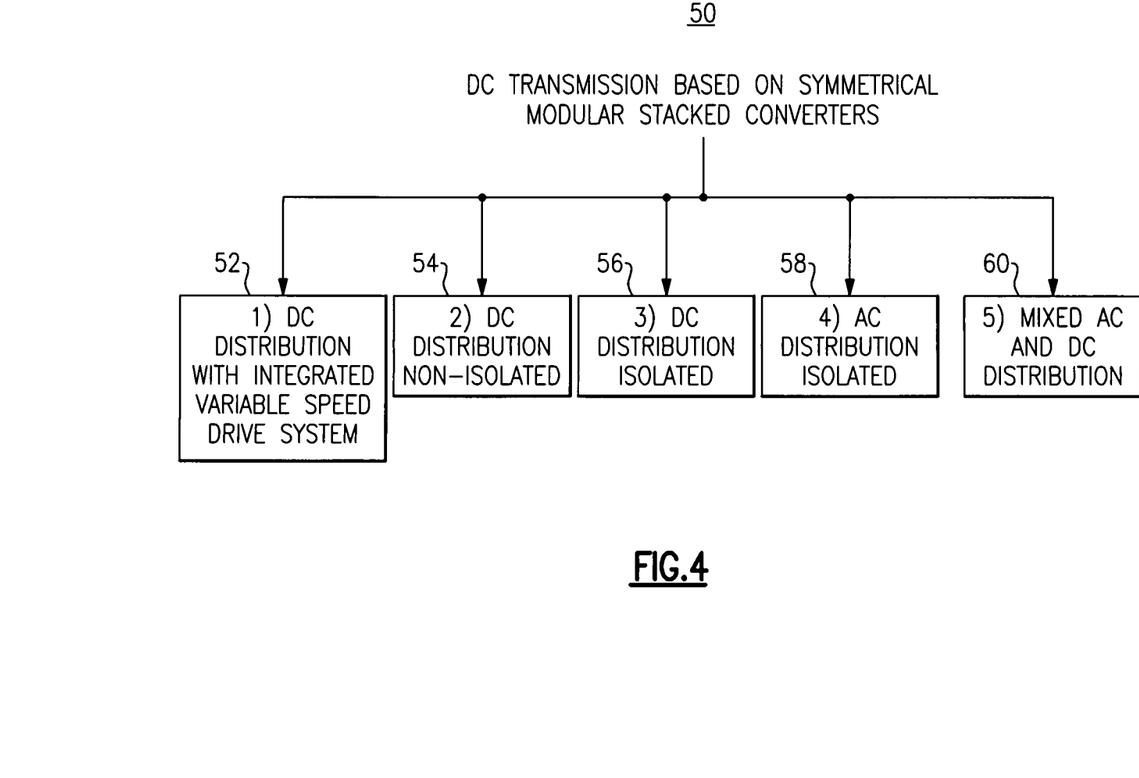
FIG. 4 is a diagram that identifies a plurality of modular stacked sub-sea power delivery system topologies in accordance with exemplary embodiments of the present invention.

FIG. 4 is a high level diagram identifying a plurality of DC transmission based sub-sea power delivery system topologies 50 in accordance with exemplary embodiments of the present invention. The DC transmission based topologies 50 each are implemented with symmetrical modular stacked converter concepts described in further detail herein. These modular stacked converters provide a means for easily reconfiguring a sub-sea power delivery system such that the system meets or exceeds site expansion requirements and supports diverse electrical sub-sea load topologies. The sub-sea power delivery system 10 may be required, for example, to provide a workable solution over short or long transmission distances, to accommodate high power or low power load consumption requirements, and/or to accommodate mismatched transmission/distribution voltages and sub-sea load voltages.

The plurality of modular stacked sub-sea power delivery system topologies 50 can be seen to include 1) DC distribution with integrated variable speed drive system 52 in which both the transmission and distribution voltages are DC voltages and the modular stacked converters are integrated into the sub-sea loads, 2) a system 54 in which both the transmission and distribution voltages are DC voltages and the distribution voltages are not isolated from the transmission voltage, 3) a system 56 in which both the transmission and distribution voltages are DC voltages and the distribution voltages are isolated (i.e. galvanic isolation via a transformer) from the transmission system, 4) a system 58 in which the transmission voltage is a DC voltage and the distribution voltage is an isolated AC voltage, and 5) a system 60 in which the transmission voltage is a DC voltage and the distribution voltage includes both DC voltage and AC voltage. The transmission voltage in each of the topologies 50 is a DC transmission voltage that results in reduced transmission cable 14 costs when compared with AC transmission voltage cable costs.

Figure 5:
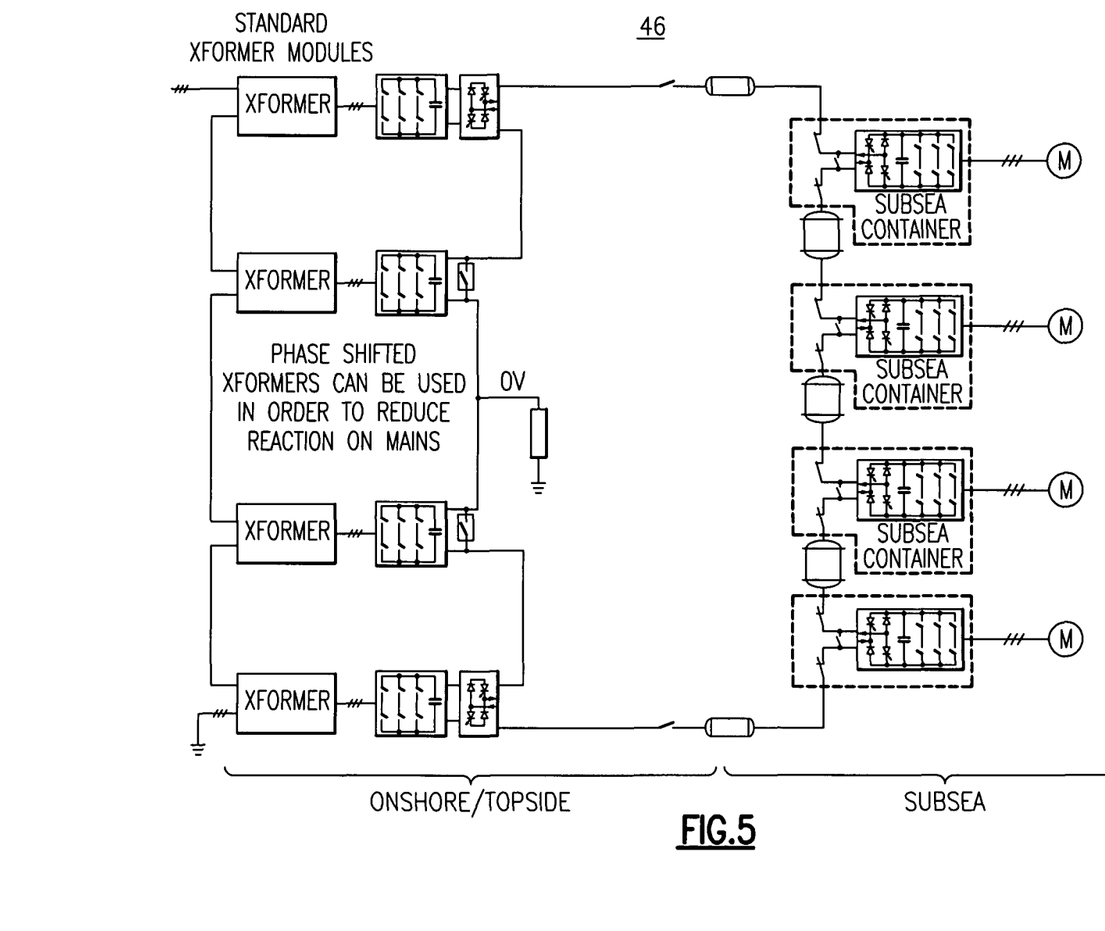
FIG. 5 illustrates an exemplary sub-sea power delivery system in which the sending end of a DC transmission line is implemented with stacked modular power converters and the receiving end of the DC transmission line is configured to integrate a plurality of loads to the DC transmission line, and corresponds to one topology identified in FIG. 4, according to one embodiment of the invention.

FIG. 5 illustrates an exemplary sub-sea power delivery system 46 in which the sending end of a DC transmission line is implemented with stacked modular power converters and the receiving end of the DC transmission line is configured to integrate a plurality of loads to the DC transmission line, and corresponds to one topology identified in FIG. 4, according to one embodiment of the invention. Sub-sea power delivery system 46 is suitable for use when the transmission/distribution voltage substantially matches total consumer voltages, according to one aspect of the invention. The modular stacked power converter topology on the sub-sea side can be seen to be symmetrical with the modular stacked power converter topology on the on-shore or top-side of the system 46.

Figure 6:
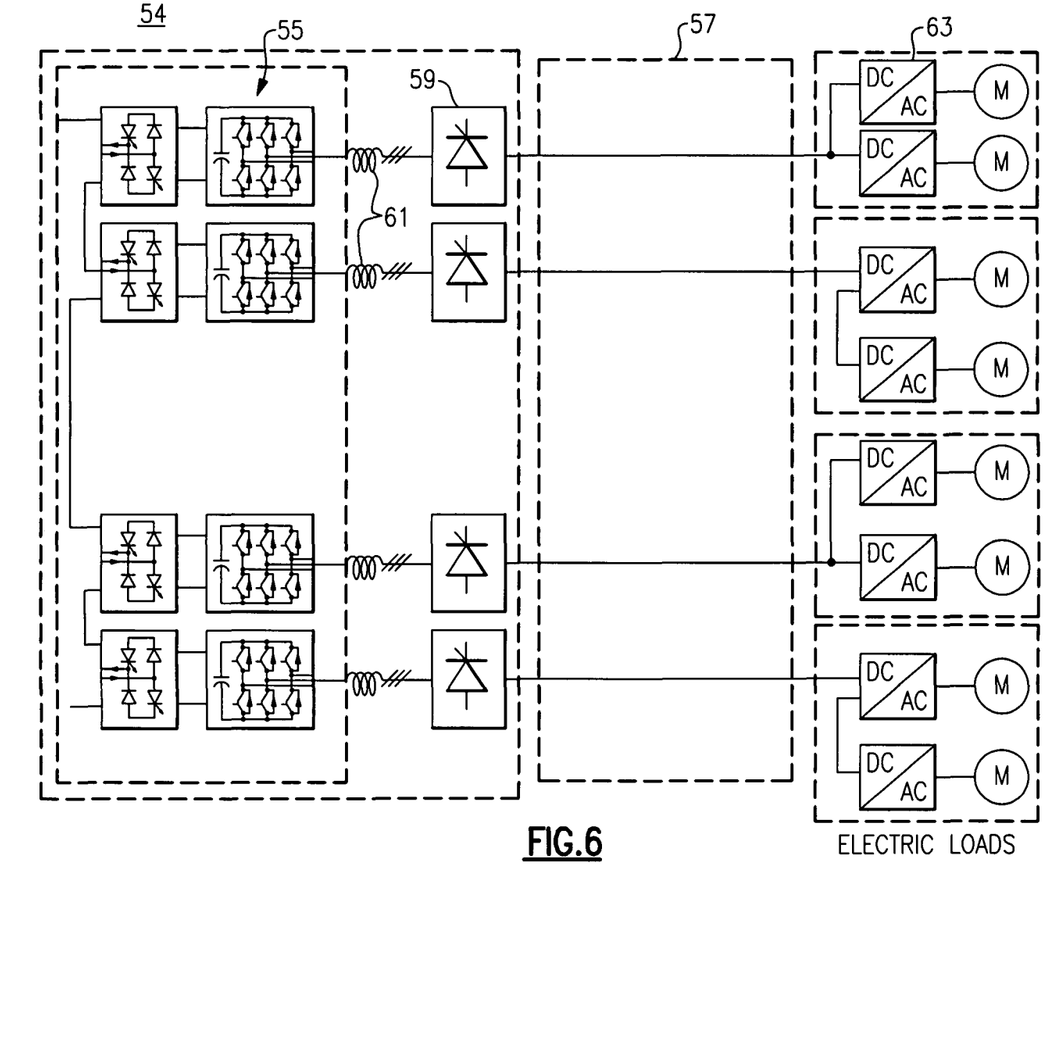
FIG. 6 is a detailed diagram of the receiving end of a DC transmission line for a sub-sea power delivery system in which the receiving end is implemented with modular stacked power converters to receive a DC transmission voltage, and is configured to provide one or more intermediary DC distribution buses through one or more AC-DC converters connected to corresponding modular converters through series-connected inductances, and corresponds to one topology identified in FIG. 4 according to one embodiment of the invention.

FIG. 6 is a detailed diagram of the receiving end of a DC transmission line for a sub-sea power delivery system in which the receiving end is implemented with modular stacked power converters 55 to receive a DC transmission voltage, and is configured to provide one or more intermediary DC distribution buses 57 through one or more AC-DC converters 59 connected to corresponding modular converters 55 through series-connected inductances 61, and corresponds to one topology 54 identified in FIG. 4 according to one embodiment of the invention. The DC distribution buses 57 may be configured using, for example, a radial structure or a ring structure to deliver DC power to one or more electric loads 63.

Figure 7:
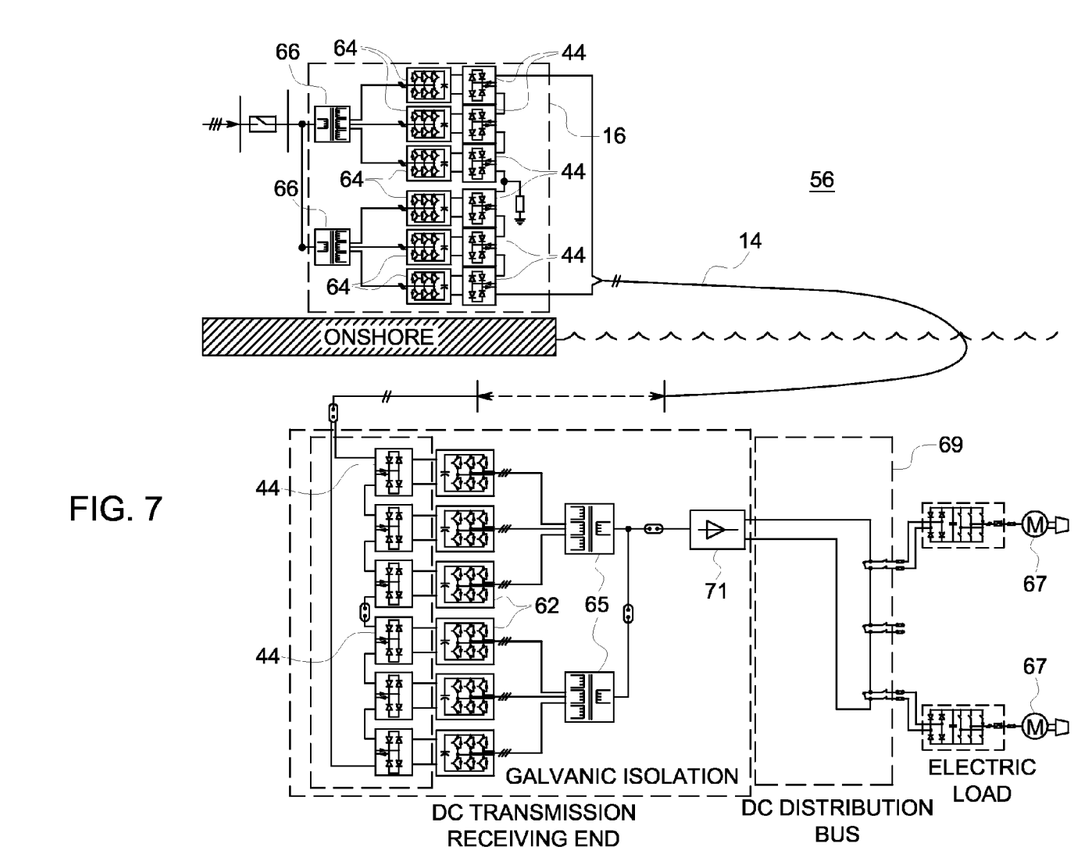
FIG. 7 is a detailed diagram of a sub-sea power delivery system in which the receiving end of a DC transmission line is implemented with modular stacked power converters to receive a DC transmission voltage and is configured to provide one or more intermediary DC distribution buses through one or more AC-DC converters connected to corresponding modular converters through one or more galvanic isolation transformers, and corresponds to one topology identified in FIG. 4, according to one embodiment of the invention.

FIG. 7 is a detailed diagram of the sending and receiving end of a sub-sea power delivery system in which the receiving end of a DC transmission line is implemented with modular stacked power converters 62 to receive a DC transmission voltage and is configured to provide one or more intermediary DC distribution buses 69 for delivering DC power to one or more electric loads 67 through one or more AC-DC converters 71 connected to corresponding modular converters 62 through one or more galvanic isolation transformers 65, and corresponds to one topology 56 identified in FIG. 4, according to one embodiment of the invention. System topology 56 is suitable for use when the total DC transmission voltage does not substantially match the total sub-sea load voltage. In this case the voltage at the transmission stage is stepped down to the voltage of the distribution system by means of the isolation transformers 65. The isolation transformers 65 may be low frequency transformers, medium frequency transformers, high frequency transformer, or combinations thereof according to particular embodiments of the invention. Low frequencies may be, for example, 16.7 Hz, 50 Hz or 60 Hz. Medium frequencies may be in a frequency range between about 200 Hz to about 1 kHz. High frequencies may be in a frequency range between about 5 kHz to about 20 kHz. The present invention is not so limited however, and it shall be understood that other embodiments implemented according to the principles described herein may provide workable solutions using isolation transformers configured to operate at any one or more frequencies in a frequency range between about 10 Hz and about 20 kHz.

The power generation system 20 depicted in FIG. 1 is suitable for use in each of the modular stacked power deliver systems described herein in which electric power may be provided by, for example, an electrical generator 22 driven via a turbine 24. According to one embodiment, the on-shore or topside load module 16 comprises a plurality of modular AC to DC rectifier building blocks 64, each rectifier 64 responsive to a reduced generator signal via a transformer such as a polygon transformer 66. Each rectifier building block 64 may be, for example, a two-level or a three-level rectifier, although only a two-level rectifier is illustrated for purposes of simplicity. Each rectifier building block 64 is switched in a manner that results in a timing phase-shifted output signal. Each polygon transformer 66 operates in a manner that results in a spatially phase-shifted output signal with respect to the remaining transformer output signals. Together, these timing phase-shifts and spatial phase-shifts advantageously operate to cancel harmonic components that would otherwise appear on the transmission voltage, the distribution voltage, and/or the load voltage(s). The topside or on-shore load module 16 may also comprise a plurality of chopper modules 44 that are configured to operate as bypass switches such that each chopper module 44 can provide a bypass for its corresponding rectifier 64 if necessary due to failure of the corresponding rectifier 64.

The sub-sea portion of the modular stacked sub-sea DC power delivery system topology 56 includes a plurality of modular DC to DC converters 62 in a stacked topology. Each modular converter 62 can also be bypassed in the event of failure via a chopper module 44. The modular stacked converter topology on the sub-sea side of the DC transmission bus/link 14 can be seen to be symmetrical with the modular stacked converter topology on the on-shore/top-side of the DC transmission bus/link 14.

Figure 8:
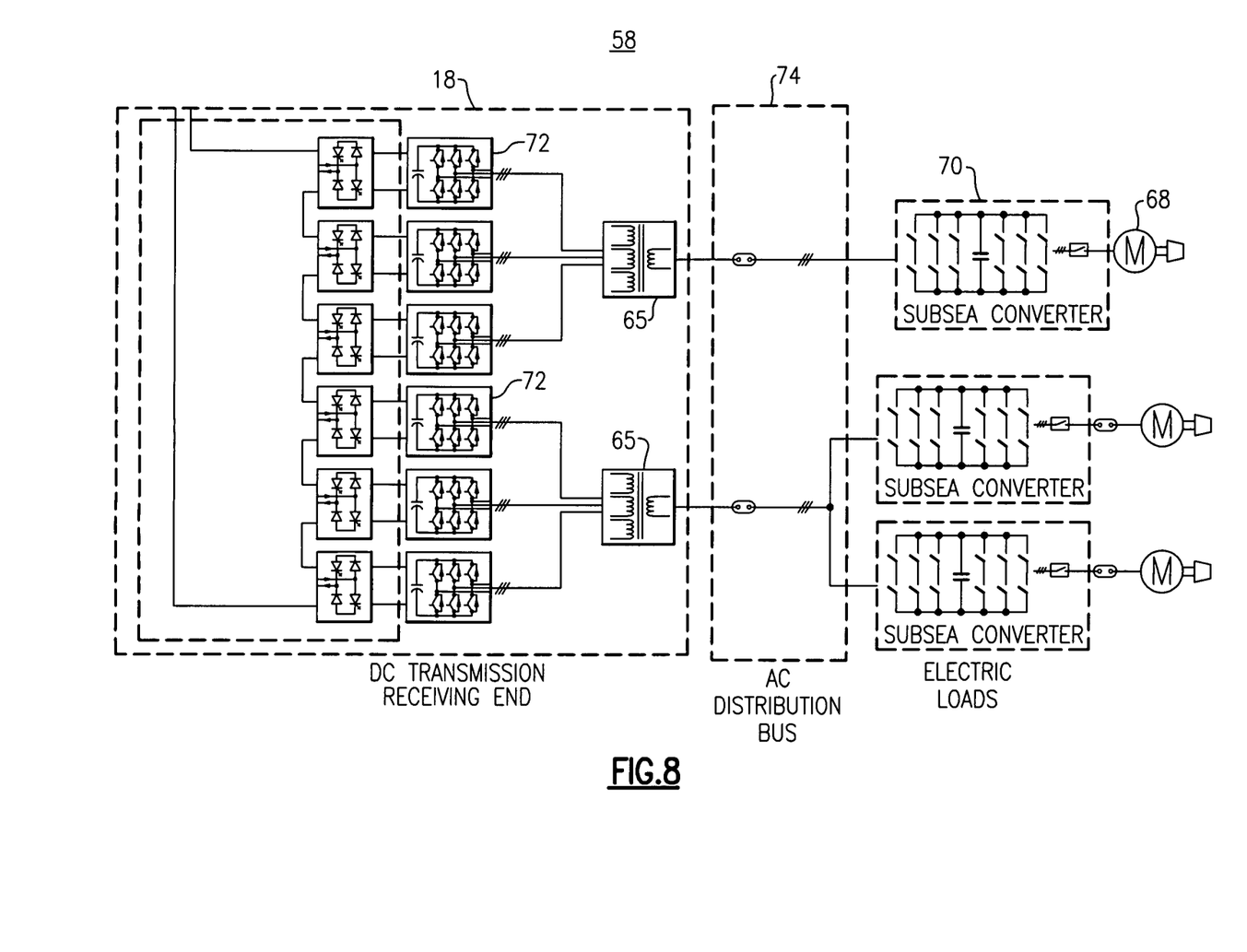
FIG. 8 is a detailed diagram of the receiving end of a sub-sea power delivery system in which the receiving end of a DC transmission line is implemented with modular stacked power converters to receive a DC transmission voltage and is configured to provide one or more intermediary AC distribution buses through one or more transformers and corresponds to one topology identified in FIG. 4, according to one embodiment of the invention.

FIG. 8 is a detailed diagram of the receiving end of a sub-sea power delivery system in which the receiving end of a DC transmission line is implemented with modular stacked power converters 72 to receive a DC transmission voltage and is configured to provide one or more intermediary AC distribution buses 74 through one or more transformers 65 and corresponds to one topology identified 58 in FIG. 4, according to one embodiment of the invention. Each sub-sea load 68 can be seen to have its own variable speed drive 70. The sub-sea load module 18 in one topology 58 comprises a plurality of modular DC to AC converter building blocks 72 that are stacked together to generate at least one AC voltage. Transformers 65 provide isolation between the receiving end of the DC transmission 18 and the sub-sea loads 68 that are driven via the corresponding variable speed drives 70.

Sub-sea transformers 65 comprise multiple three-phase windings on the primary side and tap changers on the secondary side, according to particular aspects of the invention. This feature provides substantial flexibility over known sub-sea distribution systems, since the tap changers do not have to operate under load and provide a mechanism to adapt the output voltage(s) depending upon the number of series-connected transmission modules in operation, and depending on the number of connected sub-sea loads 68. The sub-sea transformers 65 can be parallel or series connected, or connected by a changeover switch, for example, to change from parallel to series connected in order to accommodate different output voltages.

Figure 9:
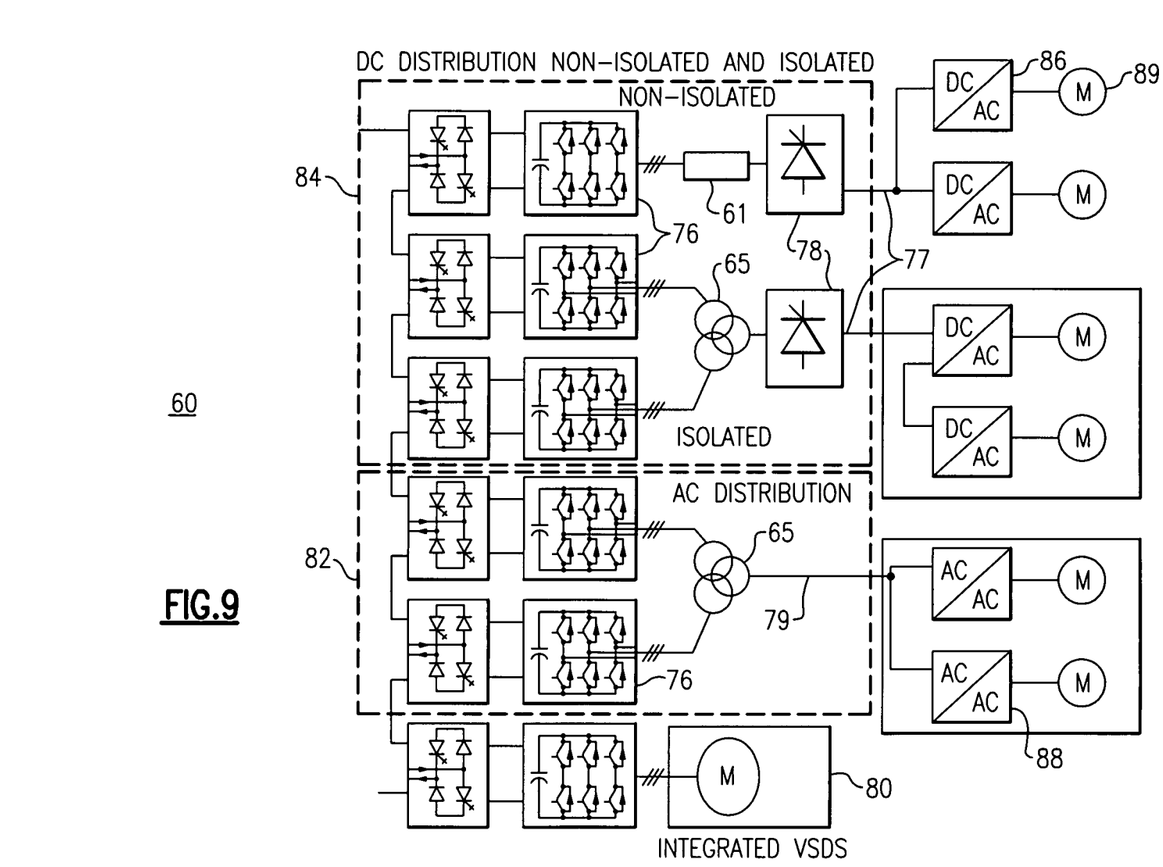
FIG. 9 is a detailed diagram of the receiving end of a sub-sea power delivery system in which the receiving end of a DC transmission line is implemented with modular stacked power converters to receive a DC transmission voltage and is configured to provide 1) one or more intermediary DC distribution buses without or with isolation through one or more isolation transformers, 2) one or more intermediary AC distribution buses through one or more corresponding transformers, and 3) one or more loads integrated to the DC transmission line, and corresponds to one or more topologies as identified in FIG. 4, according to one embodiment of the invention.

FIG. 9 is a detailed diagram of the receiving end of a sub-sea power delivery system in which the receiving end of a DC transmission line is implemented with modular stacked power converters 76 to receive a DC transmission voltage and is configured to provide 1) one or more intermediary DC distribution buses 77 without or with isolation through one or more isolation transformers 65, 2) one or more intermediary AC distribution buses 79 through one or more corresponding transformers 65, and 3) one or more loads 80 integrated to the DC transmission line, and corresponds to a mixed topology 60 as identified in FIG. 4, according to one embodiment of the invention.

System topology 60 includes a plurality of modular power converter building blocks 76 that may be stacked to provide a DC to AC inverter portion 82 of a modular stacked sub-sea load module and DC to DC converter portion 84 of the modular stacked sub-sea load module. The DC to AC inverters 76 may be configured with an inductor element 61 and a rectifier mechanism 78 to generate MVDC or HVDC power for a plurality of variable speed DC drives 86 for delivering DC power to one or more electric loads 89. The DC to AC inverters 76 may also be configured to directly generate MVAC or HVAC power for a plurality of variable speed AC drives 88. The modular DC to DC converter portion 84 with integrated transformer 65 may function as a DC coupler to reduce a high DC voltage to a low DC voltage level that is suitable for use with the corresponding sub-sea loads.

Figure 10:
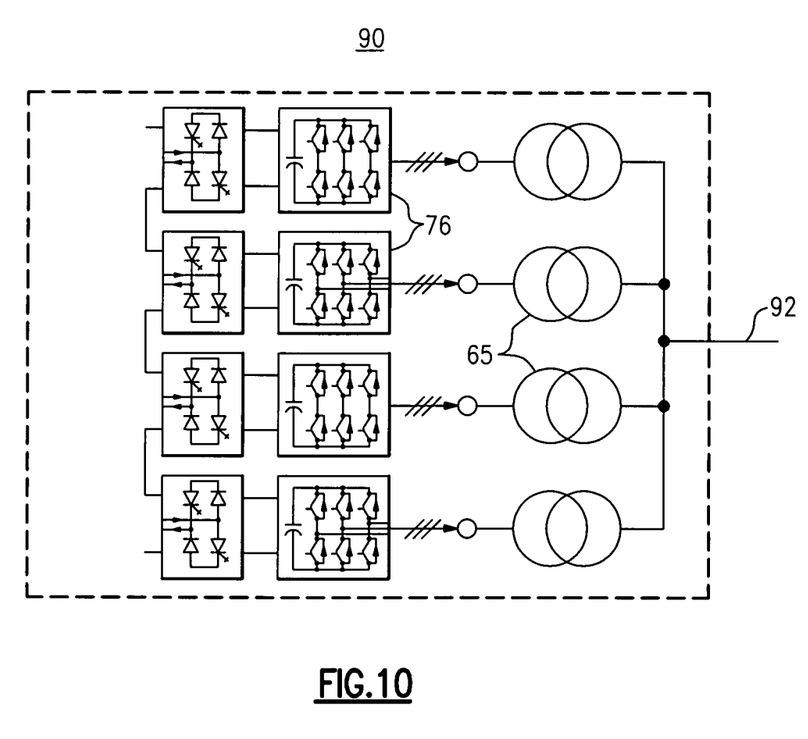
FIG. 10 is a detailed diagram of the receiving end of a sub-sea power delivery system in which the receiving end of a DC transmission line is implemented with modular stacked power converters to receive a DC transmission voltage and is configured to provide an AC distribution bus for control power at the receiving end of the DC transmission line with galvanic isolation and corresponds to one topology identified in FIG. 4 according to one embodiment of the invention.

FIG. 10 is a detailed diagram of the receiving end 90 of a sub-sea power delivery system in which the receiving end of a DC transmission line is implemented with modular stacked power converters 76 to receive a DC transmission voltage and is configured to provide an AC distribution bus 92 for control power at the receiving end of the DC transmission line with galvanic isolation 65 and corresponds to at least one topology identified in FIG. 4 according to one embodiment of the invention.

All sub-sea installations require control systems. Sub-sea control systems may consist of dozens or hundreds of low power consumers, e.g. electrically driven actuators for the physical displacements of valves. Transmitting power for sub-sea control systems over long distances is challenging because these loads typically require a constant sub-sea bus bar voltage. The stacked converter topology shown in FIG. 10 offers a solution to supply control power over hundreds of kilometers in a reliable manner. The loads to be supplied are generally low voltage/low power (not necessarily motor driven loads); and there may be a large number of low power consumers sub-sea, typically designed for an AC supply voltage, e.g. 400 V, 60 Hz.

In summary explanation, several sub-sea power delivery system embodiments have been described herein. These sub-sea power delivery system embodiments employ modular power converter building blocks that are easily stacked and configured based on site expansion requirements and electrical load topologies. Each sub-sea power delivery system embodiment may comprise a system DC transmission bus/link configured to carry power from a top-side or on-shore power source to at least one sub-sea load module. A power generation system comprising a plurality of modular power converters that are stacked and configured together with the top-side or on-shore power source is employed to generate medium voltage direct current (MVDC) or high voltage direct current (HVDC) power that is transferred via the DC transmission bus/link. A sub-sea power delivery system comprising a plurality of modular power converters that are stacked and configured together at the sub-sea load side of the system generates desired sub-sea distribution system voltages in response to the MVDC or HVDC transmission power. The stacked modular power converter topology on the sub-sea side of the sub-sea power delivery system is symmetrical with the stacked modular power converter topology on the on-shore/top-side of the sub-sea power delivery system.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power delivery system comprising an AC power source configured to deliver power to one or plural AC loads via a DC transmission bus, the DC transmission bus comprising a sending end and a receiving end, the sending end coupled to a plurality of modular power converters configured in a stacked modular power converter topology, the receiving end coupled to a plurality of modular power converters configured in a stacked modular power converter topology, wherein the stacked modular power converter topology at the receiving end is symmetrical with the stacked modular power converter topology at the sending end, and wherein at least one receiving end modular power converter comprises a switching mechanism that is configured to operate as a modular power converter bypass switch, and further configured to regulate a DC link voltage for a corresponding modular stacked power converter.

2. The power delivery system according to claim 1, wherein one or more AC loads are directly connected to one or more corresponding receiving end modular converters.

3. The power delivery system according to claim 1, wherein one or more AC loads are connected to one or more corresponding receiving end modular converters via at least one transformer.

4. The power delivery system according to claim 1, wherein the modular power converter topology at the receiving end of the DC transmission bus comprises a DC to DC conversion stage configured to provide an intermediate DC distribution bus.

5. The power delivery system according to claim 4, wherein the modular power converter topology at the receiving end of the DC transmission bus further comprises a DC to AC conversion stage configured to provide an AC bus.

6. The power delivery system according to claim 5, further comprising an AC to DC conversion stage coupled to an AC output of the DC to AC conversion stage.

7. The power delivery system according to claim 4, wherein the plurality of stacked modular power converters at the receiving end of the DC transmission bus further comprise one or a plurality of DC to AC converters coupled to the intermediate DC distribution bus and configured to drive one or more sub-sea loads.

8. The power delivery system according to claim 7, wherein the sub-sea loads are coupled to the DC transmission bus via a ring structure via corresponding power converters.

9. The power delivery system according to claim 7, wherein the receiving end further comprises one or more isolation transformers configured to isolate one or more sub-sea loads from the intermediate distribution bus.

10. The power delivery system according to claim 9, wherein each transformer and a corresponding stacked modular power converter to which the transformer is coupled together are configured to operate at a low frequency at or below about 60 Hz.

11. The power delivery system according to claim 9, wherein each transformer and a corresponding stacked modular power converter to which the transformer is coupled together are configured to operate at a medium frequency between about 200 Hz and about 1 kHz.

12. The power delivery system according to claim 9, wherein each transformer and a corresponding stacked modular power converter to which the transformer is coupled together are configured to operate at a high frequency between about 5 kHz and about 20 kHz.

13. The power delivery system according to claim 1, wherein the receiving end of the DC transmission bus further comprises an intermediate AC distribution bus, each receiving end modular converter configured together with a corresponding transformer, the receiving end modular converters and corresponding transformers configured together to provide the intermediate AC distribution bus.

14. The power delivery system according to claim 13, wherein each transformer and a corresponding stacked modular power converter to which the transformer is coupled together are configured to operate at a low frequency at or below about 60 Hz.

15. The power delivery system according to claim 13, wherein each transformer and a corresponding stacked modular power converter to which the transformer is coupled together are configured to operate at a medium frequency between about 200 Hz and about 1 kHz.

16. The power delivery system according to claim 13, wherein each transformer and a corresponding stacked modular power converter to which the transformer is coupled together are configured to operate at a high frequency between about 5 kHz and about 20 kHz.

17. The power delivery system according to claim 13, wherein each stacked modular power converter is configured to operate in an interleaved gating pattern with respect to each other stacked modular power converter.

18. The power delivery system according to claim 13 wherein each stacked modular power converter is configured to operate in a non-interleaved gating pattern with respect to each other stacked modular power converter.

19. The power delivery system according to claim 13, wherein each stacked modular power converter is configured to operate in a phase-shifted gating pattern with respect to each other stacked modular power converter.

20. The power delivery system according to claim 1, wherein the receiving end comprises:

a plurality of separated intermediate DC distribution buses, each separated intermediate DC distribution bus comprising a modular DC/AC converter configured together with a corresponding transformer and a corresponding rectifier mechanism to provide a corresponding intermediate DC distribution bus; and an intermediate AC distribution bus comprising one or more modular DC/AC converters and corresponding transformers configured together to provide the intermediate AC distribution bus.

21. The power delivery system according to claim 20, wherein the intermediate AC distribution bus is configured to operate at a low frequency at or below about 60 Hz in response to operation of the one or more modular DC/AC converters and corresponding transformers.

22. The power delivery system according to claim 20, wherein each intermediate AC distribution bus is configured to operate at a medium frequency between about 200 Hz and about 1 kHz in response to operation of the one or more modular DC/AC converters and corresponding transformers.

23. The power delivery system according to claim 20, wherein each intermediate AC distribution bus is configured to operate at a high frequency between about 5 kHz and about 20 kHz in response to operation of the one or more modular DC/AC converters and corresponding transformers.

24. The power delivery system according to claim 20, wherein each modular stacked converter is configured to operate with an interleaved gating pattern with respect to the other modular stacked converters.

25. The power delivery system according to claim 20, wherein each modular stacked converter is configured to operate with a non-interleaved gating pattern with respect to the other modular stacked converters.

26. The power delivery system according to claim 1, wherein the sending end further comprises at least one bypass switch configured to provide a bypass path around a corresponding failed sending end modular power converter.

27. The power delivery system according to claim 1, wherein at least one receiving end modular converter is configured both as a power converter and as an integrated variable speed drive to control a corresponding sub-sea load.

28. The power delivery system according to claim 1, wherein each receiving end modular converter is a DC to DC converter configured to reduce a high voltage DC or a medium voltage DC transmission voltage to a DC distribution voltage associated with a corresponding variable speed drive to control a corresponding sub-sea load.

29. The power delivery system according to claim 1, wherein each receiving end modular converter is configured to operate in an interleaved fashion with respect to at least one other receiving end modular converter.

30. The power delivery system according to claim 1, wherein the receiving end stacked modular power converters are together configured as a coupling mechanism between a medium voltage DC or high voltage DC transmission voltage and desired sub-sea load voltages.

31. The power delivery system according to claim 30, wherein each receiving end modular power converter comprises a DC to AC inverter.

32. The power delivery system according to claim 30, wherein the desired sub-sea load voltages comprise both MVDC voltages and MVAC voltages.

33. The power delivery system according to claim 1, wherein the receiving end stacked modular power converters are configured to accommodate both medium voltage (MV) DC or high voltage (HV) DC sub-sea loads and MVAC or HVAC sub-sea loads.

34. The power delivery system according to claim 1, wherein the modular stacked power converters at the receiving end are configured to operate such that unwanted harmonic signals are substantially canceled on the DC transmission bus, and at the AC power source.

35. The power delivery system according to claim 1, wherein the sending end further comprises a plurality of polygon transformers, wherein the plurality of polygon transformers are configured to generate spatially phase shifted AC signals, and the sending end modular stacked power converters are configured to generate timing phase shifted signals such that together the spatially phase shifted AC signals and the timing phase shifted signals substantially cancel harmonic signals on the DC bus.

36. The power delivery system according to claim 1, wherein the modular stacked power converters are configured to operate as AC to DC converters, DC to DC converters, or DC to AC converters.

* * * * *